M. B. RYAN.
MACHINE FOR MAKING WELDED CHAINS.
APPLICATION FILED NOV. 3, 1909. RENEWED OCT. 19, 1912.

1,123,931.

Patented Jan. 5, 1915.

6 SHEETS—SHEET 1.

Witnesses:
Nathan C. Lombard
Charles L. Hogan

Inventor:
Michael B. Ryan,
by Walter E. Lombard,
Atty.

M. B. RYAN.
MACHINE FOR MAKING WELDED CHAINS.
APPLICATION FILED NOV. 3, 1909. RENEWED OCT. 19, 1912.

1,123,931.

Patented Jan. 5, 1915.
6 SHEETS—SHEET 3.

Witnesses:
Nathan C. Lombard
Charles L. Hogan

Inventor:
Michael B. Ryan,
by Walter E. Lombard,
Atty.

M. B. RYAN.
MACHINE FOR MAKING WELDED CHAINS.
APPLICATION FILED NOV. 3, 1909. RENEWED OCT. 19, 1912.

1,123,931.

Patented Jan. 5, 1915.

6 SHEETS—SHEET 5.

Witnesses:
Nathan C. Lombard
Charles L. Hogan

Inventor:
Michael B. Ryan,
by Walter E. Lombard,
Atty.

M. B. RYAN.
MACHINE FOR MAKING WELDED CHAINS.
APPLICATION FILED NOV. 3, 1909. RENEWED OCT. 19, 1912.
1,123,931.
Patented Jan. 5, 1915.
6 SHEETS—SHEET 6.
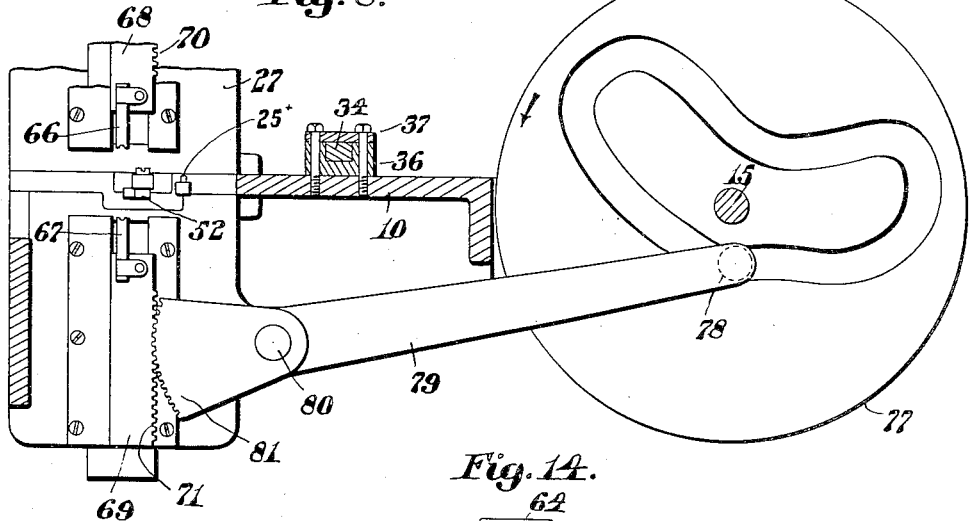
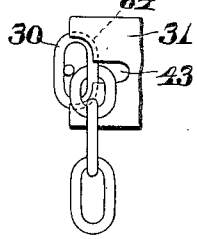
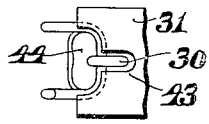
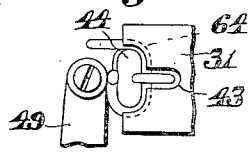
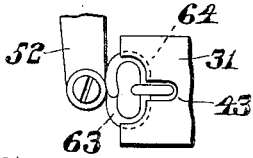
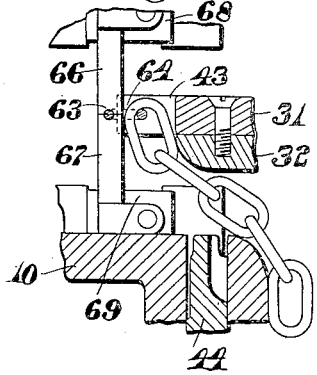
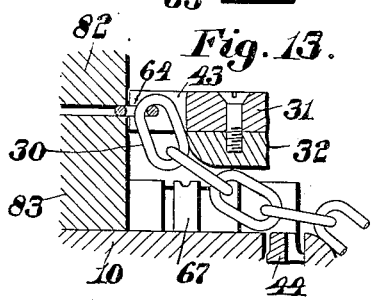
Witnesses:
Nathan C. Lombard
Charles L. Hogan
Inventor:
Michael B. Ryan,
by Walter E. Lombard,
Atty.

UNITED STATES PATENT OFFICE.

MICHAEL B. RYAN, OF BOSTON, MASSACHUSETTS.

MACHINE FOR MAKING WELDED CHAINS.

1,123,931.  Specification of Letters Patent.  Patented Jan. 5, 1915.

Application filed November 3, 1909, Serial No. 526,113. Renewed October 19, 1912. Serial No. 726,648.

*To all whom it may concern:*

Be it known that I, MICHAEL B. RYAN, a citizen of the United States of America, and a resident of Boston, in the county of Suffolk and State of Massachusetts, have invented certain new and useful Improvements in Machines for Making Welded Chains, of which the following is a specification.

This invention relates to machines for manufacturing chains and has for its object the provision of an apparatus adapted to cut from a wire a suitable blank with beveled ends and then to form said blank into a link with the beveled ends overlapping and afterward feed said link so that the overlapped ends are presented to a welding device adapted to weld the ends together.

One of the principal objects of the invention is to so bend the links that the beveled ends are overlapped at the side of the link and then welded together, thus making a much stronger link.

Another object of the invention is to provide means after the welding of the ends has been accomplished to subject said welded portion to pressure to remove therefrom the bur or other enlargements usually produced by such welding.

The invention consists in certain novel features of construction and arrangement of parts which will be readily understood by reference to the description of the drawings and to the claims hereinafter given.

Figure 1:
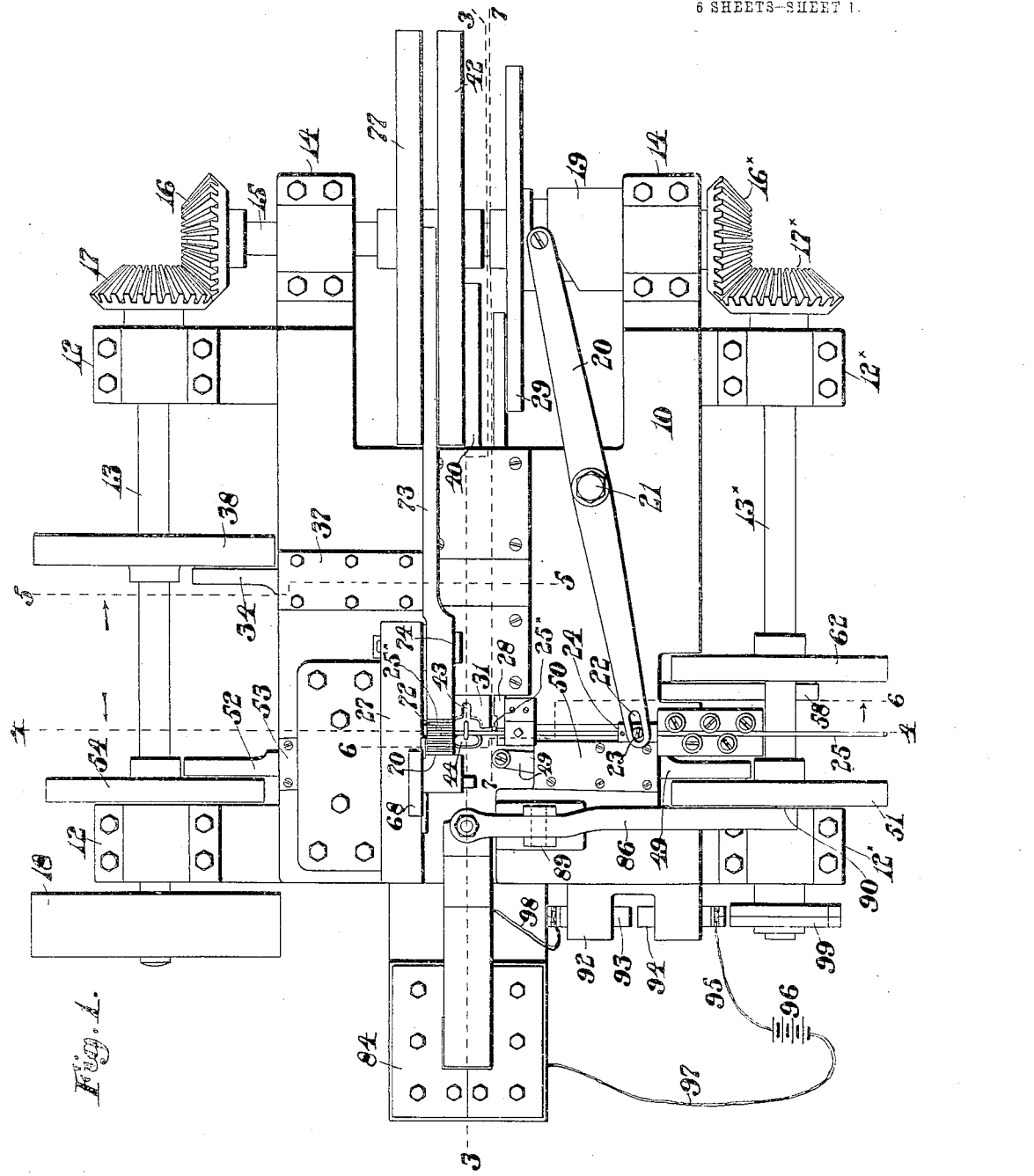
Figure 2:
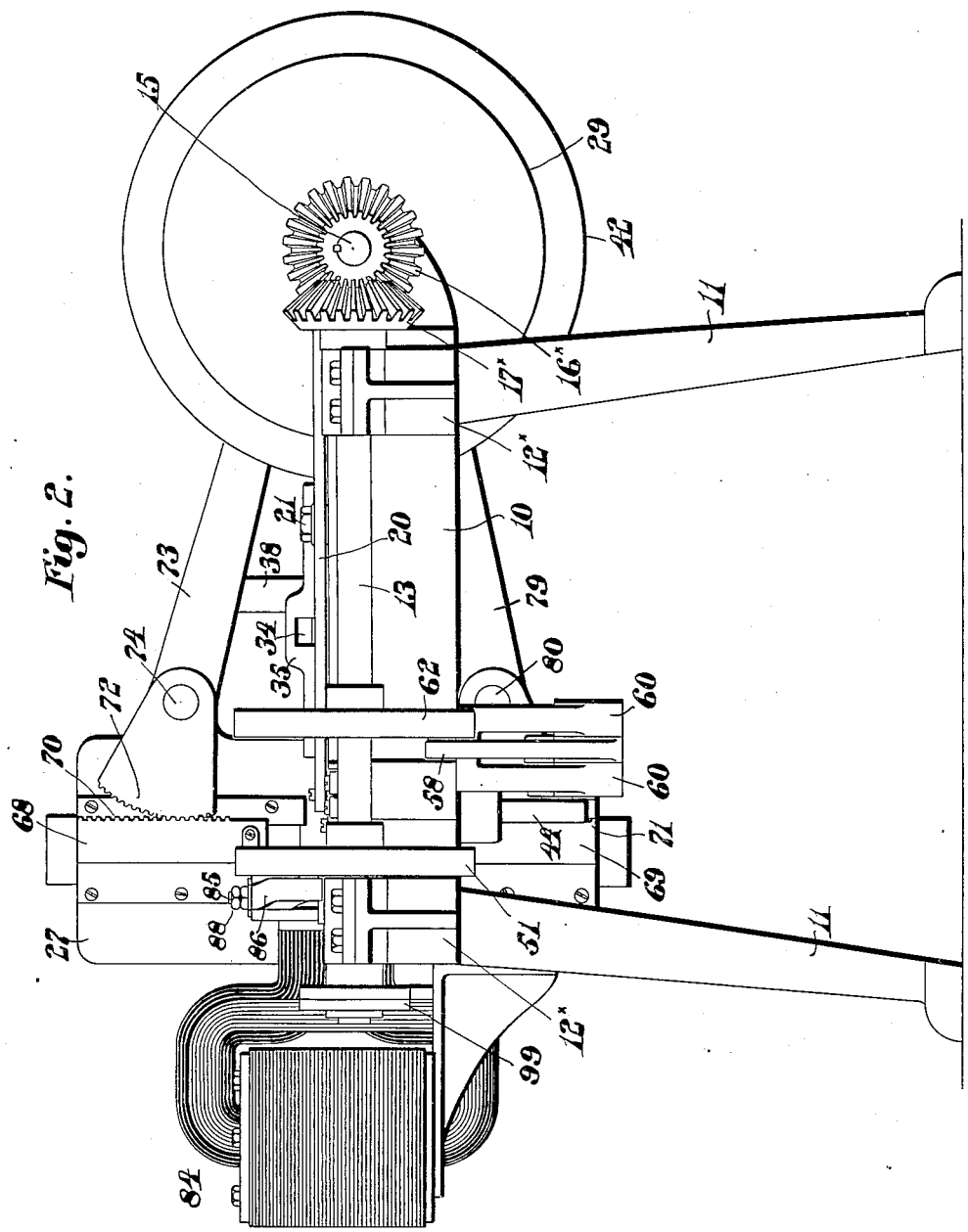
Figure 3:
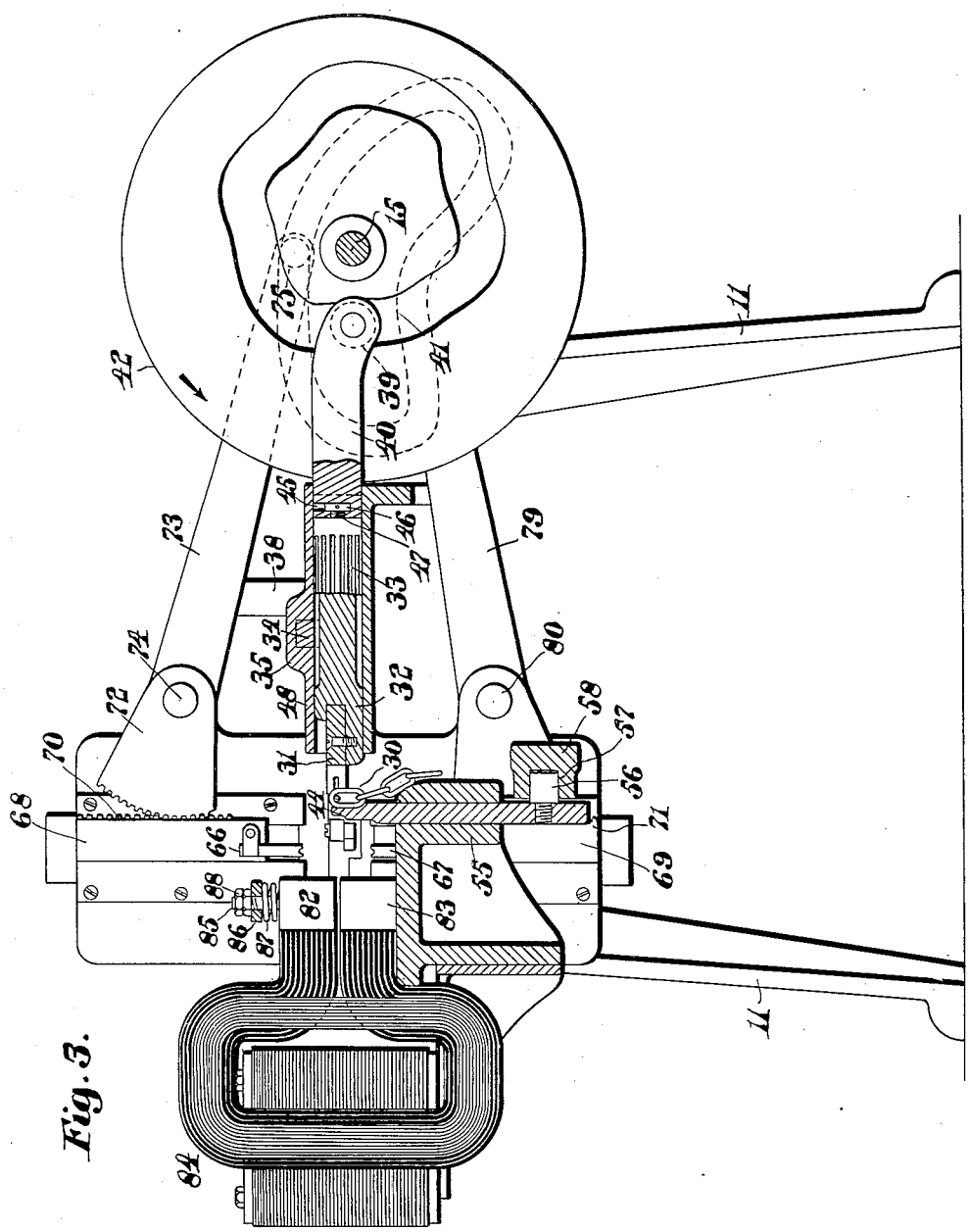
Figure 4:
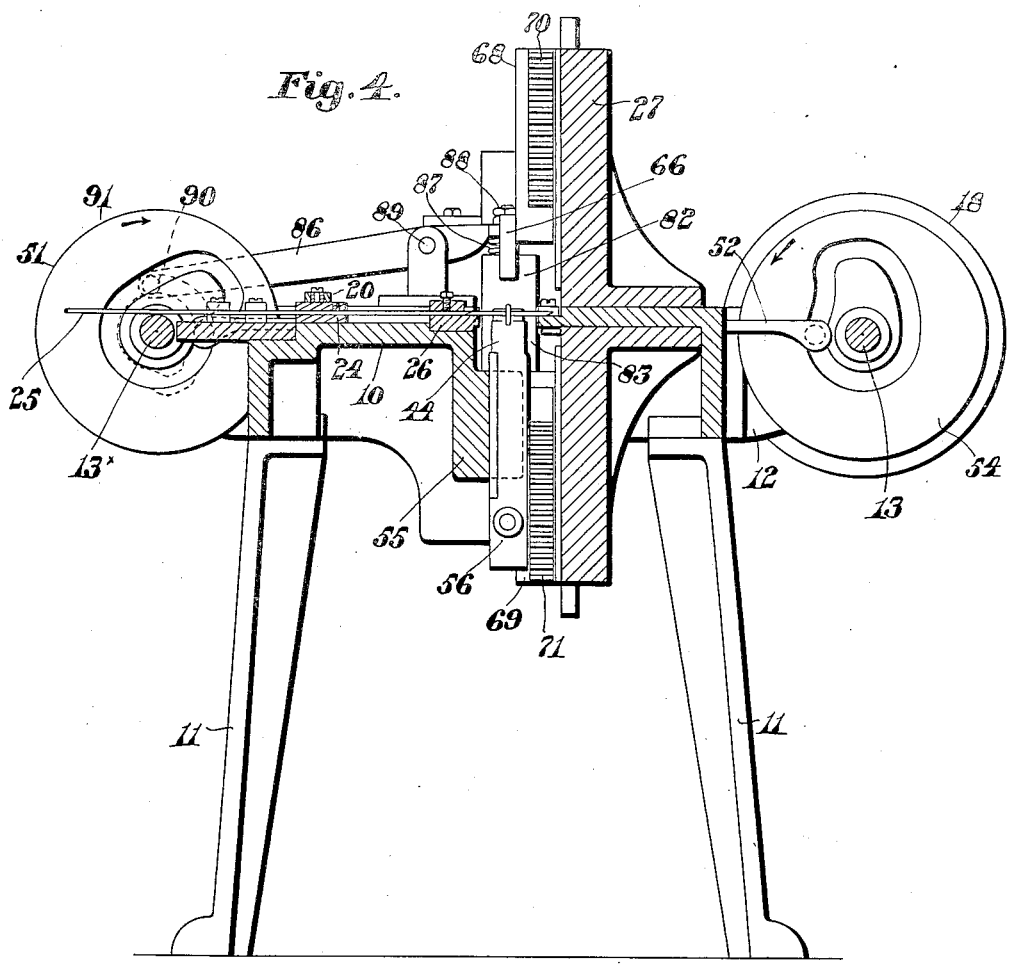
Figure 5:
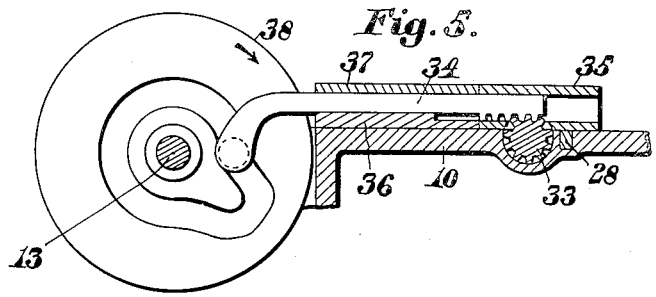
Figure 6:
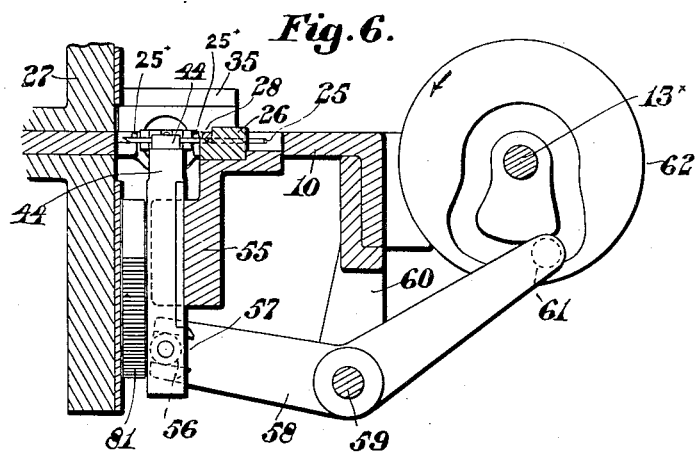
Figure 7:
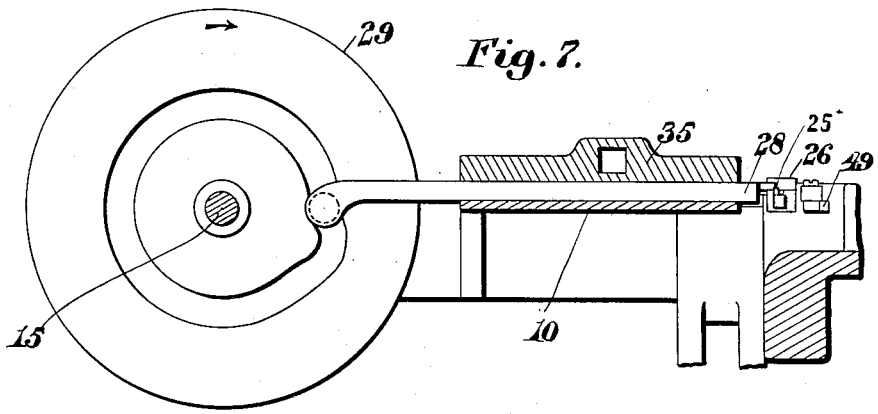

Of the drawings: Figure 1 represents a plan of a machine embodying the features of this invention. Fig. 2 represents a front elevation of the same. Fig. 3 represents a longitudinal vertical section of the same, the cutting plane being on line 3—3 on Fig. 1. Fig. 4 represents a transverse vertical section of the same, the cutting plane being on line 4—4 on Fig. 1. Fig. 5 represents a vertical section of a portion of the machine showing the mechanism for changing the position of the link after it has been welded, the cutting plane being on line 5—5 on Fig. 1. Fig. 6 represents a vertical transverse section of a portion of said machine showing the mechanism for raising and lowering the tool about which the ends of the blank are bent preparatory to its formation into a link, the cutting plane being on line 6—6 on Fig. 1. Fig. 7 represents a longitudinal vertical section of a portion of the machine showing the mechanism for cutting from a wire or rod a blank from which the link is to be formed, the cutting plane being on line 7—7 on Fig. 1. Fig. 8 represents a longitudinal section of a portion of the machine showing the mechanism for operating the pressure applying device to the link after the welding has been completed. Fig. 9 represents a detail in plan of the tool for bending the ends of the blank preparatory to the formation of the link. Fig. 10 represents a similar view showing one end of the blank bent into position preparatory to the completion of the link. Fig. 11 represents a similar view showing the other end of the blank bent into position overlapping the other end thereof. Fig. 12 represents a vertical sectional detail showing the link thus formed moved into a new position and being subjected to pressure by the pressure members. Fig. 13 represents a similar section showing the link advanced into a position between the jaws of the welding device, and Fig. 14 represents a detail showing the positions of the link and the finished chain attached thereto after it has returned into its original position and been turned at right angles thereto preparatory to the feeding therethrough of a new blank from which the next link is to be formed.

Similar characters designate like parts throughout the several figures of the drawings.

In the drawings, 10 represents a suitable table or bed supported upon the legs 11. Brackets 12 extend from the rear side of the table 10 and are provided with bearings in which is mounted the revoluble shaft 13, while on the opposite side of the table 10 are secured brackets 12* having bearings in which is mounted the revoluble shaft 13*. Other brackets 14 are secured to the right end of the bed 10 and are provided with bearings in which is mounted the revoluble shaft 15. On one end of the revoluble shaft 15 is mounted a beveled gear 16 and on the other end a gear 16*. The gear 16 meshes with the gear 17 secured to the end of the shaft 13 and in a similar manner the bevel gear 16* meshes with a bevel gear 17* secured to the end of the shaft 13*.

The shaft 13 has secured thereon the pulley 18 adapted to receive a belt through which rotary movement is imparted to the shafts 13, 15, and 13*. On the shaft 15 is mounted a cam member 19 adapted in its rotation to move a feed lever 20 about its pivot 21. The opposite end of said feed lever is provided with a slot 22 through which extends a projection 23 from the feed block 24. Through the feed block 24 extends a wire or rod 25 which is fed the requisite distance for the formation of a blank during each rotation of the cam member 19. This rod or wire 25 is fed through a block 26 and when said wire has been fed sufficiently through said block toward the upright 27 secured to the upper face of the bed 10, the cutter member 28 is moved forward by means of the cam path in the cam disk 29 to sever a blank from said rod or wire 25. The cutting member 28 is so constructed as to cut said blank from the rod or wire with a beveled side at each end facing in opposite directions, as indicated in Fig. 4 of the drawings. As the blank is fed through the block 26 it passes through a previously formed link 30, as indicated in Fig. 4 of the drawings, the link 30 being supported in the end of the oscillating member 31. This member 31 is secured to the cylindrical member 32 having in its periphery a plurality of gear teeth 33 with which mesh the teeth of the reciprocating rack 34. This reciprocating member 34 is mounted in bearings in the member 35 secured to the upper face of the bed 10 and in the member 36 also secured to the upper face of the bed 10 and provided with the cap 37 secured thereto in any well-known manner. This reciprocating rack 34 is operated by means of the cam path in the cam disk 38 secured to the revoluble shaft 13. As soon as the blank has been fed through the previously formed link and severed from the wire or rod 25, the member 31 is withdrawn toward the right end of the machine to permit the link previously formed to be separated from said member, the blank being prevented from following said member 31 by the stop pins 25*, said link being then supported by the blank cut from the wire 25. While the member 31 is in this extreme position the cam 38 will operate the rack 34 to cause the member 32 to make a quarter turn and return the member 31 into a horizontal position. When this operation has been completed the roll 39 upon the end of the member 40 will be operated upon by the path 41 in the cam disk 42 to move the members 31 and 32 forward until the end engages the blank, the previously formed link 30 entering the slot 43 in the end of the member 31. The ends of the member 31 will, during this forward movement, come into contact with the ends of the blank and force them around the former 44 into the position shown in Fig. 9 of the drawings.

The member 40 is provided with a slot 45 in which is inserted a nut 46 pinned to the reduced end 47 on the member 32, thus providing means for locking the two members 32 and 40 together to cause their simultaneous reciprocation within the casing 48 provided for the member 32 while permitting an oscillatory movement of the member 32 independent of the part 40.

When the blank has had its ends bent around the former 44 into the position shown in Fig. 9 of the drawings, a member 49, mounted in bearings 50 secured to the upper face of the bed 10 is moved forward into contact with the front end of the blank by means of the cam disk 51, a continuation of this movement of the member 49 bending the end over around the former 44 into the position indicated in Fig. 10 of the drawings. When this end has been moved into this position a similar member 52 reciprocating in a bearing 53 secured to the upper face of the bed 10 at the rear of the machine is moved forward by the cam disk 54 into contact with the rear end of the blank and forces this end of the blank around the former 44 into the position shown in Fig. 11 of the drawings. These successive operations cause a link to be formed with the beveled ends overlapping one another at one side of the link. This feature of overlapping the ends of the link is an important feature of the invention as it makes a much stronger link and simplifies the operation of welding over a link where the ends abut one another.

Where the ends of the link abut it is necessary that they should register accurately with the welding device when fed thereto while where the ends overlap one another this is not so essential as the feeding forward of the link into the jaws of the welding device might be more or less out of alinement and still be in position to be effectually operated upon by the welding apparatus. Moreover, by welding the ends of the link together at the side of the link it makes a much stronger link than where the links are welded at one end as in such cases where the links are welded on the sides each end is connected by one side of the link integral with said ends and as the pull is always at the ends there is less liability of the link giving away owing to an imperfect welding. Moreover, the welding of the links at the sides provides a better opportunity of submitting the welded portion to pressure after the welding has been completed in order to remove the bur and swellings from the welded portion which is caused by this operation.

The former 44 is mounted in a suitable guide 55 secured to the under side of the bed 10 and has secured to its lower end a roll 56 positioned within a groove 57 formed upon a lever 58 pivoted at 59 to a suitable bracket 60 secured to the bed 10. The opposite end of the lever 58 is provided with a roll 61 operated by a cam disk 62 upon the revoluble shaft 13*. When the blank has been bent into the form of a link as indicated in Fig. 11, the members 49 and 52 will be successively withdrawn from the contact with said link and then the cam disk 62 will act upon the lever 58 to lower the former 44 from the link 63, thus formed. The link 63 is at this time supported in the groove 64 in the forward end of the member 31, which, when the former 44 has been removed from the link, will be moved forward by means of the cam disk 42 acting upon the roller 39 so that the link will be brought into the position indicated in Fig. 12 of the drawings with the overlapping ends thereof in the path of movement of the pressure members 66 and 67. These pressure members 66 and 67 are provided at their outer ends with a semi-cylindrical groove which is adapted to fit over the overlapped ends of the link 63, and, when pressure is applied thereto, force the two overlapped ends into firm contact with one another and in alinement. The member 66 is secured to a slidable member 68 while the member 67 is secured to a slidable member 69. These slides 68 and 69 are each respectively provided with a plurality of rack teeth 70 and 71. The teeth of a segment 72 mesh with the rack teeth 70, this gear segment 72 being formed upon the end of a lever 73 pivoted at 74 and provided with a roller 75 adapted to be operated by the cam path 76 in the rear face of the cam disk 42. The shaft 15 is also provided with a cam disk 77 having a suitable cam path therein in which is positioned the roller 78 upon the outer end of a lever 79 pivoted at 80, the opposite end of which is provided with a gear segment 81 meshing with the rack teeth 71 of the slide 69. When the link 63 has been advanced into the position indicated in Fig. 12 of the drawings the cams 42 and 77 will act upon the levers 73 and 79 to move the slides 68 and 69, toward each other and apply the necessary pressure to the overlapped ends of the link 63 and force them together. As soon as these overlapped ends have been subjected to sufficient pressure by this means the slides 68 and 69 will be moved away from each other out of the path of movement of the link 63 and the member 31 supporting the same. The cam path 41 in the cam disk 42 will then advance the link 63 so that the overlapped ends will be positioned between the electrodes 82 and 83 of a suitable electric welding device 84 secured to the lefthand end of the machine.

The welding device 84 is provided with means in connection with the electrodes thereof to apply pressure to the link while the welding is taking place. This means of applying pressure is as follows: The lower electrode 83 is stationary and the upper electrode 82 has secured thereto a spindle 85 extending through a lever 86 between which and the upper electrode is a spring 87. Threaded to the upper end of said spindle are adjusting nuts 88. This lever 86 is pivoted at 89 and its outer end is provided with a roller 90 positioned within the cam path 91 in the lefthand face of the cam disk 51 secured to the revoluble shaft 13*.

On the lefthand end of the machine is mounted a bracket 92 supporting the contact members 93 and 94. The contact member 94 is slidable in a bearing formed in said bracket 92 and is connected by a wire 95 to any suitable source of electric energy 96. This source of electric energy is also connected by the wire 97 to the primary coil of the welding device 84 while the other contact 93 is connected to the opposite end of said primary coil by the wire 98.

Secured to the lefthand end of the shaft 13* is a cam member 99 which is adapted in its revolution to move the slidable contact member 94 into contact with the contact member 93 to make the circuit and cause a current to pass through the electrodes and weld the two overlapped ends of the link 63 positioned between them, the cam path 91 operating at substantially the same time while these ends are heated to apply sufficient pressure thereto to cause the necessary welding and to insure the joining of the two overlapped ends.

The operation of welding and the pressure applied thereto while the joint is in a heated state will cause a bur or swelling to be formed upon that portion of the link thus united. It is obvious that it is desirable to remove this bur or swelling as quickly as possible while it is heated and in order to accomplish this, as soon as the welding has been completed, the cam path 41 on the cam disk 42 will act upon the roller 39 to move the member 31 with the link 63 supported thereby until the jointed ends thereof are returned into a position beneath the pressure members 66 and 67 when pressure will again be applied thereto to remove the bur or swelling at the joint of the link which has been caused by the welding of the ends together. This operation having been completed and the bur having been removed the cam path 41 will again move the member 31 with the link 63 supported thereby into position opposite the end of the wire or rod 25 from which the blanks are to be formed. When the link 63 still supported by the member 31 reaches this position, the cam 38 will act upon the rack 34 to make a quarter turn of the member 31 to bring it into position shown in Fig. 14 of the drawings, thus bringing the face of the link to the end of the wire or rod 25, which by the operation of the feed ing lever may then be fed through said link. At this time a further movement of the member 31 to the right of Fig. 1 will cause the link to be removed from the groove 64 in which the link has been supported up to this time. This permits the return movement of the rack 34 to return the member 31 into its normal position without disturbing the finished link 30 which will immediately drop onto the end of the rod or wire 25 and be supported thereby. A movement of the member 31 to the left again will bring its end into contact with the projecting portion of the rod 25 which simultaneously is being cut from the rest of the wire or rod 25 by means of the cutting member 28 to form a new blank, which, having been severed from the remaining portion of the rod 25, is formed into another link, as previously described.

To sum up the operation of the machine briefly: A single cycle of operation of the machine is as follows: At the completion of a preceding cycle, the previously formed link 30 is supported in the groove 64 in the end of member 31, as shown in Figs. 3, 4 and 14, with the link 30 facing the end of the wire rod 25. This rod is next fed toward and through the link 30 the requisite distance by the feeding lever 20 and cam 19. At this time the member 31 will be moved rearwardly or to the right (Fig. 1) still further freeing the link 30, which will drop onto the end of the wire 25 and be supported thereby. Rack 34 now turns the member 31 back to its normal position (Fig. 1). The cutting member 28 and the bending member 31 now move toward the left (Fig. 1), the member 28 first cutting the wire 25 at an oblique angle and then the member 31 engages the cut length of wire with its front end (link 30 entering slot 43) and bends this length of wire about the former 44 which has been moved upwardly into the plane of the wire. The length of wire will be bent by the member 31 into the position shown in Fig. 9 of the drawings. The member 31 will remain in this position while a member 49 bends one end of the wire over and around the other face of the former 44 (see Fig. 10) and until a second bending member 52 operating from the opposite side, engages and bends the opposite end of the wire over and around this face of the former, causing a link to be formed with end faces overlapping each other at one side of the link (Fig. 11). The bending members 49 and 52 will be successively withdrawn from contact with the link ends and then the former will be lowered from the plane of the newly formed link (63) which is supported now in groove 64 in the end of member 31. When the former is lowered, this member 31 is moved forwardly or to the left in Fig. 1, to position the overlapping ends of the link between and in line with the faces of pressure members 66 and 67 which are now moved toward each other to engage the overlapping ends of the link between their faces and to apply pressure to said link so as to force said ends into firm contact and into alinement. The pressure members 66 and 67 will then be withdrawn and the member 31 will be again moved forward or to the left in Fig. 1 to present the overlapping ends of the link between the welding electrodes 82 and 83 which are forced together with the link between them, and the current is automatically turned on, heating the link ends and the electrode pressure welding the heated ends. The electrodes are then moved apart, the member 31 moved rearwardly or to the right, Fig. 1, to remove the welded link and to position it again between the pressure members 66—67 which are again actuated to press the welded ends of the link, thereby removing the rough bur formed in welding and finishing the link. The pressure members are again withdrawn and member 31 and the link are moved farther to the right, Fig. 1, and into a position opposite the end of the wire from which the link has been cut or formed. Through rack 34 and cylindrical member 32, the member 31 is now given a quarter turn to present its eye to the end of the wire 25. The former 44 has in the meantime been elevated so that the parts are now again in the position they assume at the end of the completed cycle and the commencement of the next cycle.

This makes a very effective machine for forming links from blanks of rod material or wire and in the same machine welding the ends thereof together along one side of the link in order to secure the strongest link possible, the ends thus welded being slabbed off and overlapping so that a considerable surface is welded together, making the link member stronger than would be the case where a limited amount of surface was joined together, as when the two ends abut. It also provides a very effective mechanism for removing the bur and swelling around the joint, which is caused by the welding and thus leaving the link, when it is completed, in a finished condition.

It is believed the operation and many advantages of the invention will be thoroughly understood from the foregoing.

Having thus described my invention, I claim:

1. In a chain-making machine, the combination with an electric welding apparatus; of mechanism for forming a link and overlapping its disconnected ends; means for positioning said disconnected ends between the electrodes of said welding apparatus; revoluble shafts for operating said link forming and feeding mechanisms; means operated by said shafts for closing said electrodes upon said disconnected ends; and means operated by said shafts for closing the electrical circuit of said electrodes at a predetermined time.

2. In a chain-making machine, the combination with an electric welding apparatus; of mechanism for forming a link and overlapping its disconnected ends; means for positioning said disconnected ends between the electrodes of said welding apparatus; revoluble shafts for operating said link forming and feeding mechanisms; means operated by said shafts for closing said electrodes upon said disconnected ends; and means operated by said shafts for automatically closing the electrical circuit of said electrodes.

3. In a chain-making machine, the combination with an electric welding apparatus; of mechanism for forming a link and overlapping its disconnected ends; means for positioning said disconnected ends between the electrodes of said welding apparatus; revoluble shafts for operating said link forming and feeding mechanisms; means operated by said shafts for closing said electrodes upon said disconnected ends; and a cam on one of said shafts for closing the electrical circuit of said electrodes.

4. In a chain-making machine, the combination with an electric welding apparatus; of mechanism for forming a link from a blank and bringing the disconnected ends of the blank into a position overlapping each other; advancing said link so that its disconnected ends are positioned between the electrodes of said welding apparatus; revoluble shafts for operating said link forming and feeding mechanisms; means operated by said shafts for closing the electrical circuit of said electrodes; and means operated by said shafts for subjecting said disconnected ends to pressure during the welding.

5. In a chain-making machine, the combination with an electric welding apparatus; of mechanism for feeding a blank through a previously formed link; mechanism for turning over the ends of said blank; mechanism for partially forming a link therefrom with its ends separated; means for advancing the link to position the forward ends thereof between the electrodes of said welding apparatus; revoluble shafts for operating said link forming and feeding mechanisms; and means operated by said shafts for closing the electric circuit of said electrodes.

6. In a chain-making machine, the combination with an electric welding apparatus; of mechanism for feeding a blank through a previously formed link; mechanism for turning over the ends of said blank; mechanism for partially forming a link therefrom with its ends separated; means for advancing the link to position the forward ends thereof between the electrodes of said welding apparatus; revoluble shafts for operating said link forming and feeding mechanisms; means operated by said shafts for closing the electric circuit of said electrodes; and means operated by said revoluble shafts for subjecting said ends to pressure during the operation of welding.

7. In a chain-making machine, the combination with an electric welding apparatus; of mechanism for feeding a blank through a previously formed link; mechanism for turning over the ends of said blank; mechanism for partially forming a link therefrom with its ends separated; means for advancing the link to position the forward ends thereof between the electrodes of said welding apparatus; revoluble shafts for operating said link forming and feeding mechanisms; means operated by said shafts for closing the electric circuit of said electrodes; means for withdrawing said link from said electrodes; and gripping jaws for seizing the welded ends of said link and applying pressure thereto operable by said revoluble shafts.

8. In a chain-making machine, the combination with an electric welding apparatus; of mechanism for feeding a blank through a previously formed link; mechanism for turning over the ends of said blank; mechanism for partially forming a link therefrom with its ends separated; means for advancing the link to position the forward ends thereof between the electrodes of said welding apparatus; revoluble shafts for operating said link forming and feeding mechanisms; means operated by said shafts for closing the electric circuit of said electrodes; means for withdrawing said link from said electrodes; gripping jaws for seizing the welding ends of said link and applying pressure thereto; and means for making a quarter turn of said link into position for another blank to be fed therethrough.

9. In a chain-making machine, the combination with an electric welding apparatus including a pair of electrodes, of mechanism for forming from a suitable blank a link, the ends of which overlap, means for moving said link into position for said overlapped ends to be acted upon by the electrodes of said welding apparatus, and means for operating said welding apparatus to weld together the disconnected overlapping ends of said link.

10. In a chain-making machine, the combination with an electric welding apparatus including a pair of electrodes, of mechanism for forming from a suitable blank a link, the ends of which meet at the side of said link, means for moving said link into position to be acted upon by the electrodes of said welding apparatus, and means for operating said welding apparatus to weld together the disconnected ends of said link.

11. In a chain-making machine, the combination with an electric welding apparatus including a pair of electrodes, of mechanism for forming from a suitable blank a link with its ends beveled off and overlapping, means for moving said link into position to be acted upon by the electrodes of said welding apparatus, and means for operating said welding apparatus to weld together the disconnected ends of said link.

12. In a chain-making machine, the combination with an electric welding apparatus including a pair of electrodes, of mechanism for forming from a suitable blank a link, the ends of which overlap, means for moving said link into position to be acted upon by the electrodes of said welding apparatus, and means for operating said welding apparatus to weld together the disconnected overlapping ends of said link, including a device acting upon said electrodes for subjecting the ends of said link to pressure during said welding.

13. In a chain-making machine, the combination with an electric welding apparatus including a pair of electrodes, of mechanism for forming from a suitable blank a link, means for moving said link into position to be acted upon by the electrodes of said welding apparatus, and means for operating said welding apparatus to weld together the disconnected ends of said link, including a device acting upon said electrodes for subjecting the ends of said link to yielding pressure during said welding.

14. In a chain-making machine, the combination with an electric welding apparatus including a pair of electrodes, of mechanism for forming from a suitable blank a link, means for moving said link into position to be acted upon by the electrodes of said welding apparatus, means for operating said welding apparatus to weld together the disconnected ends of said link, and a device acting upon said electrodes for subjecting the ends of said link to yielding pressure during said welding, including a revoluble cam for operating said pressure device.

15. In a chain-making machine, the combination with an electric welding apparatus including a pair of electrodes, of mechanism for forming from a suitable blank a link, means for passing the ends of the link being thus formed through one previously formed, means for subsequently moving the disconnected ends of the newly formed link between the gripping jaws of said electrodes, and means for operating said welding apparatus to electrify said electrodes and weld together said disconnected ends while thus held.

16. In a chain-making machine, the combination with an electric welding apparatus including a pair of electrodes, of mechanism for forming from a suitable blank a link, means for passing the ends of the link being thus formed through one previously formed, means for subsequently moving the disconnected ends of the newly formed link between the gripping jaws of said electrodes, means for operating said welding apparatus to electrify said electrodes and weld together said disconnected ends while thus held, and means for releasing said gripping jaws upon the completion of said welding.

17. In a chain-making machine, the combination with an electric welding apparatus including a pair of electrodes, of mechanism for forming from a suitable blank a link, means for passing the ends of the link being thus formed through one previously formed, means for subsequently moving the disconnected ends of the newly formed link between the gripping jaws of said electrodes, means for operating said welding apparatus to electrify said electrodes and weld together said disconnected ends while thus held, and cam-operated means for releasing said gripping jaws upon the completion of said welding.

18. In a chain-making machine, the combination of an electric welding device, mechanism for forming a link from a suitable blank, means for applying pressure to its disconnected overlapping ends to press them together and into alinement, and means for then delivering said disconnected ends to an electric welding device.

19. In a chain-making machine, the combination of an electric welding device, mechanism for forming a link from a suitable blank, means for applying pressure to its disconnected overlapping ends to press them together and into alinement, means for then delivering said disconnected ends to an electric welding device, and means for subsequently applying pressure to said welded ends.

20. In a chain-making machine, the combination with an electric welding apparatus, of mechanism for cutting a suitable blank with beveled ends, bending it to form a link with said beveled ends overlapping, means for applying pressure to its disconnected overlapping ends to press them together and into alinement, and then delivering it to said welding apparatus.

21. In a chain-making machine, the combination with an electric welding apparatus, of mechanism for cutting a suitable blank with beveled ends, bending it to form a link with said beveled ends overlapping, then delivering it to said welding apparatus, means for withdrawing said link from said welding apparatus, and gripping jaws adapted to seize the welded end of said link and remove the bur therefrom.

22. In a chain-making machine, the combination of mechanism for forming a link from a suitable blank with beveled ends, means for then delivering it to gripping mechanism forming the electrodes of a welding apparatus to electrically weld the overlapping beveled ends of the newly formed link, and means for successively operating said mechanism.

23. In a chain-making machine, the combination of mechanism for forming a link from a suitable blank with beveled ends, means for then delivering it to gripping mechanism forming the electrodes of a welding apparatus to electrically weld the overlapping ends of the newly formed link, and cam mechanisms for successively operating said mechanism.

24. In a chain-making machine, the combination of mechanism for forming a link from a suitable blank, means for delivering its disconnected ends between the jaws of electrodes of a welding device, means for electrifying said electrodes, and means for subsequently applying pressure to said welded ends.

25. The combination with an electric welding device, of means for bending a blank so that its ends overlap, means for applying pressure to said overlapping ends, and means for delivering said overlapping ends between the jaws of a pair of electrodes included in said welding apparatus.

26. The combination with an electric welding device, of means for bending a blank so that its ends overlap, means for applying pressure to said overlapping ends, means for delivering said overlapping ends to said welding apparatus, revoluble shafts for operating said mechanisms, and means operable by said shafts for applying pressure to said overlapped ends during the welding.

27. The combination with an electric welding device, of means for bending a blank so that its ends overlap, means for applying pressure to said overlapping ends, means for delivering said overlapping ends to said welding apparatus, revoluble shafts for operating said mechanisms, means operable by said shafts for applying pressure to said overlapped ends during the welding, and means for removing therefrom the bur formed during the welding.

28. The combination with an electric welding device, of means for bending a blank so that its ends overlap, means for delivering said overlapping ends to said welding apparatus, revoluble shafts for operating said mechanisms, means operable by said shafts for applying pressure thereto during the welding, and means for removing from the jointed ends the bur formed during the welding.

29. The combination with an electric welding device, means for bending a blank so that its ends overlap, means for delivering said overlapping ends to said welding apparatus, revoluble shafts for operating said mechanisms, means operable by said shafts for applying pressure thereto during the welding, two reciprocating jaws for removing from the jointed ends the bur formed during the welding, and means for operating said jaws.

Signed by me at 4 Post Office Sq., Boston, Mass., this 30th day of October, 1909.

MICHAEL B. RYAN.

Witnesses:
NATHAN C. LOMBARD,
CHARLES C. HOGAN.